United States Patent
Kumar et al.

(10) Patent No.: US 9,588,777 B2
(45) Date of Patent: Mar. 7, 2017

(54) METHOD AND SYSTEM OF KNOWLEDGE TRANSFER BETWEEN USERS OF A SOFTWARE APPLICATION

(71) Applicant: LANDMARK GRAPHICS CORPORATION, Houston, TX (US)

(72) Inventors: Amit Kumar, Houston, TX (US); Brian D. Davis, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 13/995,772

(22) PCT Filed: Oct. 10, 2012

(86) PCT No.: PCT/US2012/059450
§ 371 (c)(1),
(2) Date: Jun. 19, 2013

(87) PCT Pub. No.: WO2014/058418
PCT Pub. Date: Apr. 17, 2014

(65) Prior Publication Data
US 2014/0101659 A1    Apr. 10, 2014

(51) Int. Cl.
*G06F 3/00*    (2006.01)
*G06F 9/44*    (2006.01)
*G09B 19/00*   (2006.01)

(52) U.S. Cl.
CPC ....... *G06F 9/4421* (2013.01); *G09B 19/0053* (2013.01)

(58) Field of Classification Search
CPC combination set(s) only.
See application file for complete search history.

(56) References Cited

U.S. PATENT DOCUMENTS

| | | | |
|---|---|---|---|
| 5,854,924 A | 12/1998 | Rickel et al. | |
| 6,340,977 B1* | 1/2002 | Lui et al. | 715/709 |
| 7,051,322 B2 | 5/2006 | Rioux | |
| 7,747,988 B2 | 6/2010 | Zhu et al. | |
| 8,161,386 B1* | 4/2012 | Mark | 715/712 |

(Continued)

FOREIGN PATENT DOCUMENTS

WO    WO-2012045545 A1    4/2012

OTHER PUBLICATIONS

International Search Report and Written Opinion issued Apr. 26, 2013 in International Application No. PCT/US2012/059450 filed Oct. 10, 2012.

(Continued)

*Primary Examiner* — Hien Duong

(57) ABSTRACT

Knowledge transfer between users of a software application. At least some of the example embodiments are methods including: tracking steps performed by a plurality of users of a software application, and the tracking creates tracked steps; identifying a first task as a first series of steps of the tracked steps, and identifying a second task as a second series steps of the tracked steps, the second series of steps distinct from the first series of steps; and providing, on a display device associated with the software application, an indication of the first series of steps of the first task and the second series of steps of the second task, the providing to a later user interacting with the software application.

25 Claims, 11 Drawing Sheets

(56) References Cited

U.S. PATENT DOCUMENTS

| | | | |
|---|---|---|---|
| 8,214,802 B1* | 7/2012 | Graves | 717/121 |
| 8,719,775 B1* | 5/2014 | Cole et al. | 717/113 |
| 2002/0154153 A1* | 10/2002 | Messinger et al. | 345/705 |
| 2003/0229648 A1* | 12/2003 | Tang et al. | 707/104.1 |
| 2005/0091651 A1 | 4/2005 | Curtis et al. | |
| 2006/0242638 A1* | 10/2006 | Lew et al. | 717/168 |
| 2008/0244418 A1* | 10/2008 | Manolescu | G06Q 10/00 715/753 |
| 2009/0138292 A1 | 5/2009 | Dusi et al. | |
| 2009/0282393 A1 | 11/2009 | Costa et al. | |
| 2010/0131896 A1* | 5/2010 | Fitzmaurice et al. | 715/811 |
| 2011/0040824 A1* | 2/2011 | Harm | 709/203 |
| 2011/0041140 A1* | 2/2011 | Harm et al. | 719/318 |
| 2011/0099432 A1 | 4/2011 | Mundy et al. | |
| 2011/0225494 A1* | 9/2011 | Shmuylovich et al. | 715/705 |
| 2013/0074075 A1* | 3/2013 | Cavalcante et al. | 718/100 |
| 2013/0132497 A1* | 5/2013 | Partridge et al. | 709/206 |
| 2014/0075364 A1* | 3/2014 | Bragdon et al. | 715/772 |
| 2014/0101659 A1* | 4/2014 | Kumar et al. | 718/100 |

OTHER PUBLICATIONS

European Patent Office, Supplementary European Search Report, Feb. 12, 2016, 7 pages, Europe.

* cited by examiner

METHOD AND SYSTEM OF KNOWLEDGE TRANSFER BETWEEN USERS OF A SOFTWARE APPLICATION

CROSS-REFERENCE TO RELATED APPLICATIONS

This application is a U.S. National Stage patent application of International Patent Application No. PCT/US2012/059450, filed on Oct. 10, 2012, the benefit of which is claimed and the disclosure of which is incorporated herein by reference in its entirety.

BACKGROUND

In the digital age, individuals and corporations rely heavily on specialty software to perform tasks in less time and with more efficiency. The complexity of specialty software has increased over time, driven in part by increasing processor capability as well as increasing display device size and resolution. Specialty software may be so large and complex that a user may spend several years working with the specialty software before becoming fully comfortable with available features. In some cases, a particular end result may be achieved using specialty software by two or more non-identical series of steps. That is, non-identical paths defined by a series of steps may have equivalent results, but one of the non-identical paths may be better in some way (e.g., less time, fewer steps).

The complexity of some specialty software, in combination with the exposure time needed to achieve proficiency, leads to difficulties in gaining knowledge about use of the specialty software, and transferring knowledge among users.

BRIEF DESCRIPTION OF THE DRAWINGS

For a detailed description of exemplary embodiments, reference will now be made to the accompanying drawings in which.

NOTATION AND NOMENCLATURE

Figure 1:
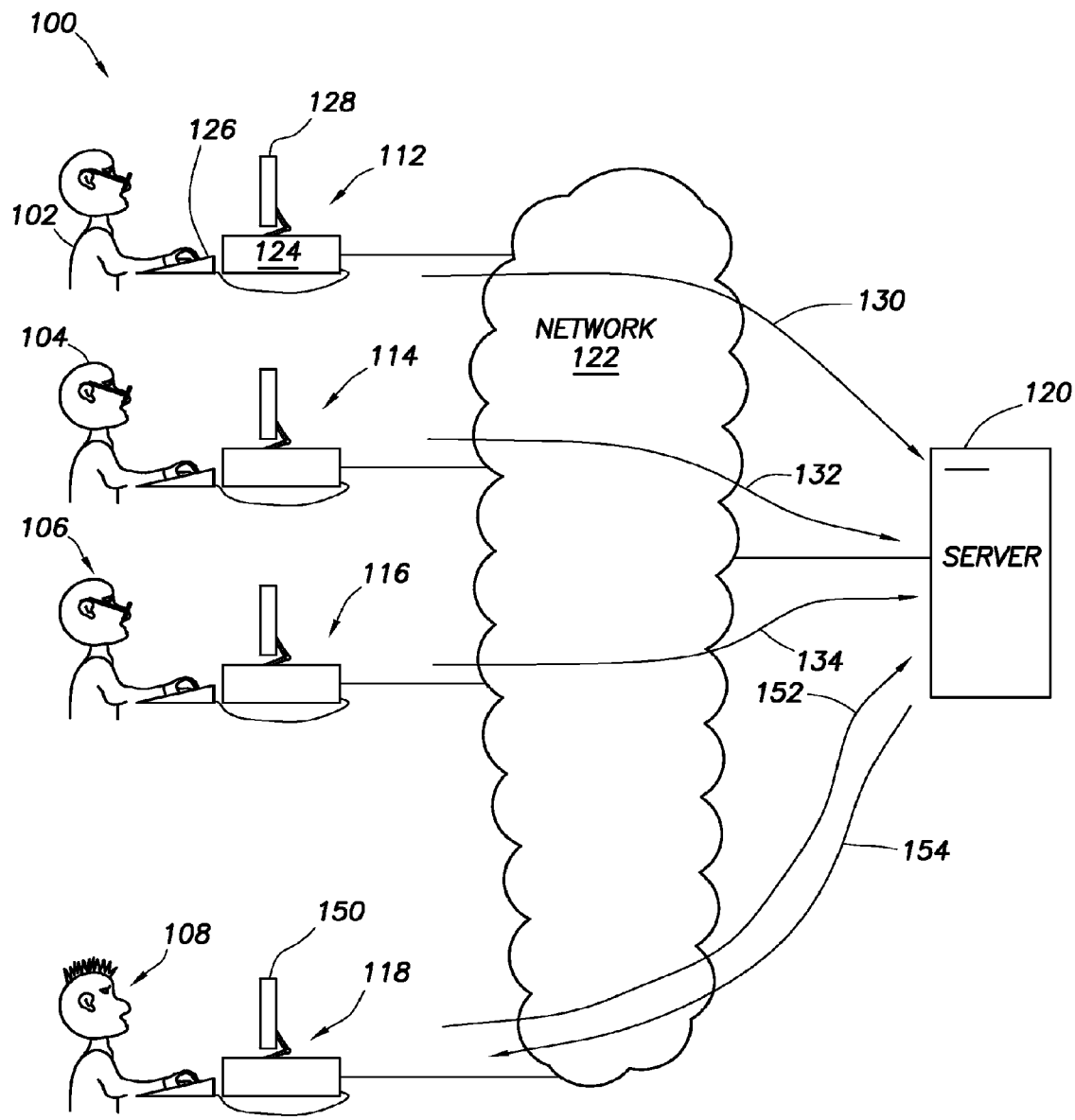
FIG. 1 shows a system in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Step" in relation to a complex software application shall mean invoking a subroutine or module that changes or modifies a data structure held in memory (e.g., random access memory (RAM), flash memory, local or remotely located hard drive, or local or remotely located optical drive). Data entry by way of a keyboard, mouse, or pointing device, shall not be considered a "step" for purposes of the specification and claims.

"Task" shall mean a series of steps executed within a software program at the direction of a user of the software program. A first task distinct from a second task by the identity of steps, number of steps, and/or order of steps can produce identical results, yet still be considered different tasks.

"Distinct from" in relation to a first series of steps and a second series of steps shall mean that either identical steps are performed in a different order, or one or more steps are found in the first series of steps but not the second series of steps.

"Remotely located" shall mean two recited objects are more than 10 meters from each other.

"Locally located" shall mean to received objects are less than 1 meter from each other.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to methods and systems of tracking usage of complex software applications, extracting knowledge from the information derived, and providing the knowledge to other users of the software applications. Consider, as an example, knowledge transfer between experienced users of a software application and novice users of the very same software application. The various methods and systems may track tasks (each task comprising a series of steps) performed by one or more experienced users. When a novice user embarks on a task, the novice user may be presented with information regarding one more tasks accomplished by more experienced users. From the information presented, the novice user may determine how to perform the task, or may be presented a different series of steps to arrive at the same end result in less time, or with fewer steps. The specification first turns to an example system to orient the reader.

FIG. 1 shows a system 100 in accordance with at least some embodiments. In particular, FIG. 1 shows an example system comprising users 102, 104, 106 and 108. Each user 102, 104, 106, and 108 interacts with a workstation computer system 112, 114, 116, and 118 (hereafter, just "workstation"). Each workstation couples to a server computer system 120 (hereafter just "server 120") by way of a network 122. Considering workstation 112 as illustrative of all the workstations, workstation 112 may comprise a processor or processor enclosure 124 coupled to various input devices (such as keyboard 126) and a display device 128. The workstation may execute a local copy of a software application, or the workstation may act as a terminal interacting with the software application executing at another location, such as on the server 120.

Each example workstation 112, 114, 116, and 118 couples to the network 122. The network 122 may take any suitable form. For example, in cases where the users, workstations, and server are all located within the same facility, the network may be a local area network (LAN) based on Ethernet protocol communications. In other cases, the server 120 may be located many tens or hundreds of miles from the location of the users 102, 104, 106, and 108, and thus the network may also include dedicated communication channels and/or portions that span the Internet. Regardless of the specific type of network 122 implemented, the network enables not only the workstations 112, 114, 116, and 118 to communicate among themselves if needed, but also enables the workstations 112, 114, 116, and 118 to communicate with the server 120.

Server 120 may take any suitable form. As illustrated, the server 120 is a standalone computer system operated as a server. In other cases, the server 120 may be a group of computer systems (e.g., a plurality of rack-mounted computer systems) operated in a parallel manner to provide services to the workstations. In yet still other cases, the server 120 may be located on the "cloud" such that the precise physical location of the functions provided by the server is not specifically known to the users and/or may change depending on the loading and usage.

Consider, as an example, each user 102, 104, 106, and 108 is working with a complex petrotechnical software application (e.g., Decisionspace™ provided by Landmark Graphics Corporation of Houston, Tex. Complex petrotechnical software applications may perform functions associated with identification and recovery of hydrocarbons from hydrocarbon reservoirs. For example, complex petrotechnical software applications may be used to view seismic data, to create and/or modify reservoir models, and to test extraction scenarios based on a reservoir model, just to name a few. Complex petrotechnical software applications may be purchased or licensed in a cafeteria style, where each purchasing and/or licensing company selects particular software modules based on the underlying need the software application is to address.

The features and functions of petrotechnical software applications are constantly evolving, and may have been developed over many years spanning a wide variety of developers and development contexts. Moreover, given that complex petrotechnical software applications may be purchased or licensed in a cafeteria style, there may be many duplicate or near duplicate functionalities that reside in different licensed software modules. Thus, depending upon what software modules a particular company has purchased or licensed, each user may perform a distinct series of steps (stated otherwise, may perform distinct tasks), where the overall result may be the same or substantially the same.

Thus, an experienced user may have in the past executed different tasks to arrive at the same result, and may therefore have identified the most beneficial (e.g., in terms of time, number of steps, invoking fewest number of licensed modules) way to achieve the end result.

Beyond potential different tasks arriving at the same or similar results, mere use of the example petrotechnical software application may be highly complex. A novice user may be overwhelmed with information and/or decisions on how to achieve an overall result. Extracting knowledge from experienced users regarding how to operate complex software application, and presenting the knowledge to novice users, may decrease the "learning curve" for novice users. Regardless of whether knowledge transfer is desired regarding selection of alternate tasks, or mere transfer of knowledge from experienced to novice users, the various embodiments enable gathering of knowledge regarding use, and conveying the knowledge to other users.

Still referring to FIG. 1, consider that users 102, 104, and 106 are experienced users (e.g., more than 5 years of experience) of the complex software application, and further consider that user 108 is a novice user (e.g., 1 year or less of experience). Again referring to user 102 as illustrative, in accordance with example systems the complex software application is instrumented such that steps performed by user 102 are tracked and recorded to create tracked steps. It is to be understood that the tracking is not necessarily a key-for-key and mouse click-for-mouse click tracking; rather, the tracking is more high level. For example, the tracking may involve keeping track of calls to distinct software modules of an overall software application, or calls to particular predetermined subroutines within the software application.

Tracking and recordation may take many forms. For example, each time user 102 invokes a step to be tracked the workstation 112 may send data to the server 120 over the network 122, the send illustrated by arrow 130. The data sent in reaction to the user 102 invoking the step may include information such as identity of the step invoked, identity of the user 102, data indicative of the data structure modified by the step, and the like. Thus, in this example, each time a predetermined step is invoked, the data is sent to the server 120. Similar sends of data based on invoking of the steps to be tracked may be sent regarding users 104 and 106 on workstations 114 and 116, respectively, as illustrated by arrows 132 and 134. In yet still other cases, the workstations may note the steps, and periodically send the data (e.g., at the end of a task, once an hour, once a day, as a shutdown procedure for the software application).

In some cases, the workstations and server may all be owned or controlled by a single entity, such as within a corporation. In such cases the amount and specificity of the data sent regarding each step may be high. For example, the data sent may include identity of the user, a project identifier, an indication of the specific modification or change implemented by invoking of the step, the name of the file or files operated upon by the step. However, in other cases the server 120 that receives the information regarding the steps may be owned or controlled by a different entity (e.g., the company that produced the software application), and the purchasing company may be sensitive about the amount of information that leaves the control of the company. In cases where the server is controlled by a third party the data sent related to each step may be much more limited, such as just an indication of the module or function invoked as the step. The specification now turns to identification of tasks.

In the context of this specification, a task is defined to be a series of steps. The end result of a task may be unique (e.g., a task creates or modifies an underlying data structure in a way that no other task within the software application may modify the underlying data structure). In other cases, two or more separately identifiable tasks may have the same resulting change to an underlying data structure. That is, a first task may comprise a series of steps performed in a particular order to arrive at an overall result, while a second task may comprise slightly different steps, or the same steps performed in a different order, also arrive at the overall result. Nevertheless, in accordance with example embodiments the system 100 identifies tasks. The level of the identification may range from merely logically grouping a series of steps to be a task, to identifying a task not only by its steps but also the end result.

Figure 2:
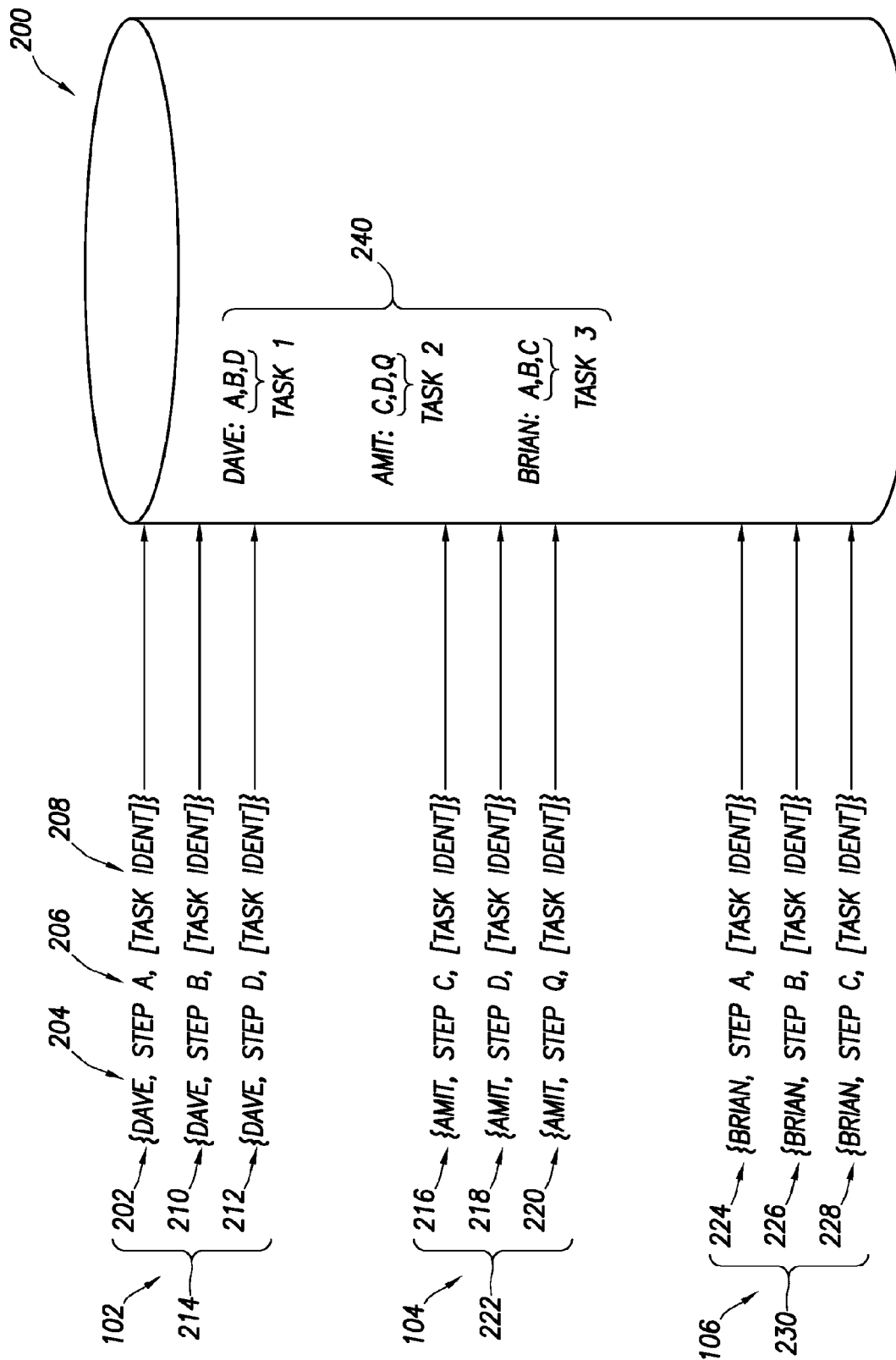
FIG. 2 graphically shows reporting and tracking steps in accordance with at least some embodiments.

FIG. 2 graphically shows tracking of steps performed at a workstation in example situations where the workstation sends an indication of invoking of each step, as well as accumulating the information in the server. In particular, FIG. 2 shows example message formats that may traverse the network 122 between the workstations (not shown in FIG. 2) and a data store 200 which may reside within server 120 (not shown in FIG. 2). FIG. 2 shows, for each of three example users (corresponding to users 102, 104, and 106), a series of messages that may flow from respective workstations to the data store 200. Referring initially to the messages associated with user 102, a first message 202 may comprise a user identifier 204 which directly or indirectly reveals the identity of the user 102. In the example message format, the name of the user is shown, but other indications are possible, such as the user's initials, employee number, or a random number assigned to the user so as not to specifically identify the user but provide uniformity as to identity of the user within the data store 200. In yet still other cases, the identity of the user may be omitted.

The next example entry in the message 202 is a step identifier 206 which identifies the step performed (illustrative shown as "STEP A"). The "step" may take any suitable form depending on the nature of the underlying software application. In some cases a step may be invoking of a particular software module within the software application (e.g., calling a first licensed module, or calling a second licensed module). In other cases the step may be calling of subroutine within the software application. Various examples of instrumenting a software application to trigger sending of the messages regarding steps for tracking purposes are discussed in greater detail below.

The next example entry in the message 202 is task identifier 208. The task identifier may likewise take many forms. For example, in some example systems the task is directly identified. For example, before embarking on a task, the software application may be programmed to query the user as to the identity of the task, and thus the message 202 may directly identify the task to which the delineated step belongs. In yet still other cases, other information that may be useful in identifying to what task a particular step belongs may be provided in the task identifier 208. For example, the task identifier 208 may include the name of a file upon which the step operates, a handle to a data structure passed to the step or modified by the step, data provided to the step, a handle for data provided to the step, data returned from they step, or handle for data returned from the step. In yet still other cases, the task identifier may be omitted.

Message 202 represents information regarding a single step, but in example embodiments a workstation may send multiple messages, one for each step invoked by the user at or near the time the step is invoked. In the example of FIG. 2, three messages 202, 210 and 212 are sent representing three invoked steps: A, B, and D. In other cases, the information regarding steps invoked may be stored on the workstation, and sent as a group at some later time, as illustrated by grouping 214.

For purposes of explanation, FIG. 2 shows example messages associated with user 104, in particular the example message 216, 218, and 220 representing invoked steps C, D and Q. As before, the messages 216, 218, and 220 could be sent proximate in time with invoking of each step, or the information could be sent as grouping 222. Likewise, FIG. 2 shows example messages associated with user 106, in particular the example message 224, 226, and 228 representing invoked steps A, B and C. As before, the messages 224, 226, and 228 could be sent proximate in time with invoking of each step, or the information could be sent as grouping 230. While each set of messages (or groupings) shows only indications of three steps, FIG. 2 is merely illustrative, and any particular interaction of a user with a workstation may result in many tens, hundreds or thousands of steps invoked, and thus messages sent (or groupings with extensive information).

Still referring to FIG. 2, the individual messages regarding individual invoking of a step (or group messages contain indication of multiple steps) are collected in the data store 200. In other words, the server 120 implementing the data store 200 creates a set of tracked steps 240. In the example case of FIG. 2, the tracked steps are from the example three experienced users 102, 104, and 106, but the tracked steps 240 may comprise invoked steps for any number of users regardless of experience.

In the situations where the workstation conglomerates the indications of the steps and also extracts from the user an identity of the tasks or tasks to which the steps belong, the group message may be considered to identify tasks (and their respective steps). In other cases, however, the relationship of a set of steps as being a task may not be fully identified by the messages or group arriving from the workstation. In such cases, the server 120, accessing data store 120 and the tracked steps 240 therein, may identify tasks represented by the steps. That is, the server 120 may programmatically identify a first series of steps as a first task, and second series of steps as a second task. For example, the server 120 accessing the tracked steps 240 from the data store may analyze the example tracked steps to determine that: steps A, B, and D executed by Dave represent a task, here "task 1"; steps C, D, and Q executed by Amit represent a task, here "task 2"; and that steps A, B, and C executed by Brian represent a task, here "task 3". Identifying example steps as a task may be trivial in the case where the workstation sends an indication of the steps as a task, but may involve application of holistic reasoning in the case where little or no information as to the relationship of the steps is included. For purposes of the later discussion, consider that task 1 and task 3 have the same overall result from a user perspective, in spite of having different constituent steps.

As an example of a situation where different steps may result in the same overall result, consider a petrotechnical application which creates hydrocarbon formation models. More specifically, consider that a geologist or geophysicist may initially start with sparsely populated data regarding an underground formation (e.g., data from one or more exploratory wellbores, in combination with data from a seismic survey). In order to achieve the overall result of a formation model spanning the entire underground formation, one user may elect to propagate the known data to other areas based on object-based geostatistics, while another user may elect to propagate the known data to the other areas based on pixel-based geostatistics. Again, the overall result in each case is a formation model, but with two different paths to arrive at the formation model.

Consider, as another example of two tasks that have same overall result, a word processing program and a desire to control the spacing between paragraphs. Many word processing programs enable the user to control not only the spacing on the page after a carriage return line feed, but also the spacing on the page before the next carriage return line feed. Thus, one user looking to make consistent the spacing between paragraphs may elect set the "leading" spacing for each paragraph, while another user looking to likewise make consistent the spacing between the paragraphs may elect to set the "trailing" spacing for each paragraph. The locations within the menus at which such adjustments are made may be different, and later users may be unaware of the options.

Returning briefly to FIG. 1, in accordance with example system the knowledge regarding steps performed by one or more users (e.g., experienced users 102, 104, and 106) may be conveyed to other users (e.g., novice user 108) to aid the novice user 108 in working with the complex software application. More particularly, the system 100 may provide (e.g., on display device 150 used by the user 108) an indication of the steps associated with tasks performed by other users. In some example cases, the novice user 108 may seek information on how to perform a task in the first sense. That is, as the novice user 108 works with the software application by way of the workstation 118, the novice user 108 may directly query 152 the server 120 for guidance on what tasks are performable within the software application. The server 120 receives the request and sends to the workstation 118 an indication of one or more tasks performable, as indicated by response 154. It is noted that an optional step in the workflow may be to have tasks validated prior to the tasks being provided to the example novice user 108. For example, a human user may validate a task before the task becomes discoverable or being able to provide the task to the novice user. In yet still other cases, a form of heuristics-based validation may be performed by the server 120 before a task is provided to a novice user.

Referring simultaneously to FIGS. 2 and 3, the example query 152 sent to the server 120 may precipitate a response 154 that identifies the example tasks: Task 1 (performed by Dave); Task 2 (performed by Amit); and Task 3 (performed by Brian). From the identified tasks, the novice user 108 may select a task and thus continue interaction with the software application.

In other example situations, the novice user 108 may be interested in learning the different tasks which may produce the same or similar overall result. In one example situation, the novice user 108 may send a query 152 to the server 120 requesting an indication of tasks that produce a particular overall result. In response, the server 120 may consult the data store 200, and send back a grouping of tasks (and related information, such as the steps of each task and an identity of an experienced user from whom the task was derived). Thus, for example, upon a query regarding tasks with a particular overall result, the workstation 118 may display a user interface window such as shown in FIG. 3.

Figure 3A:
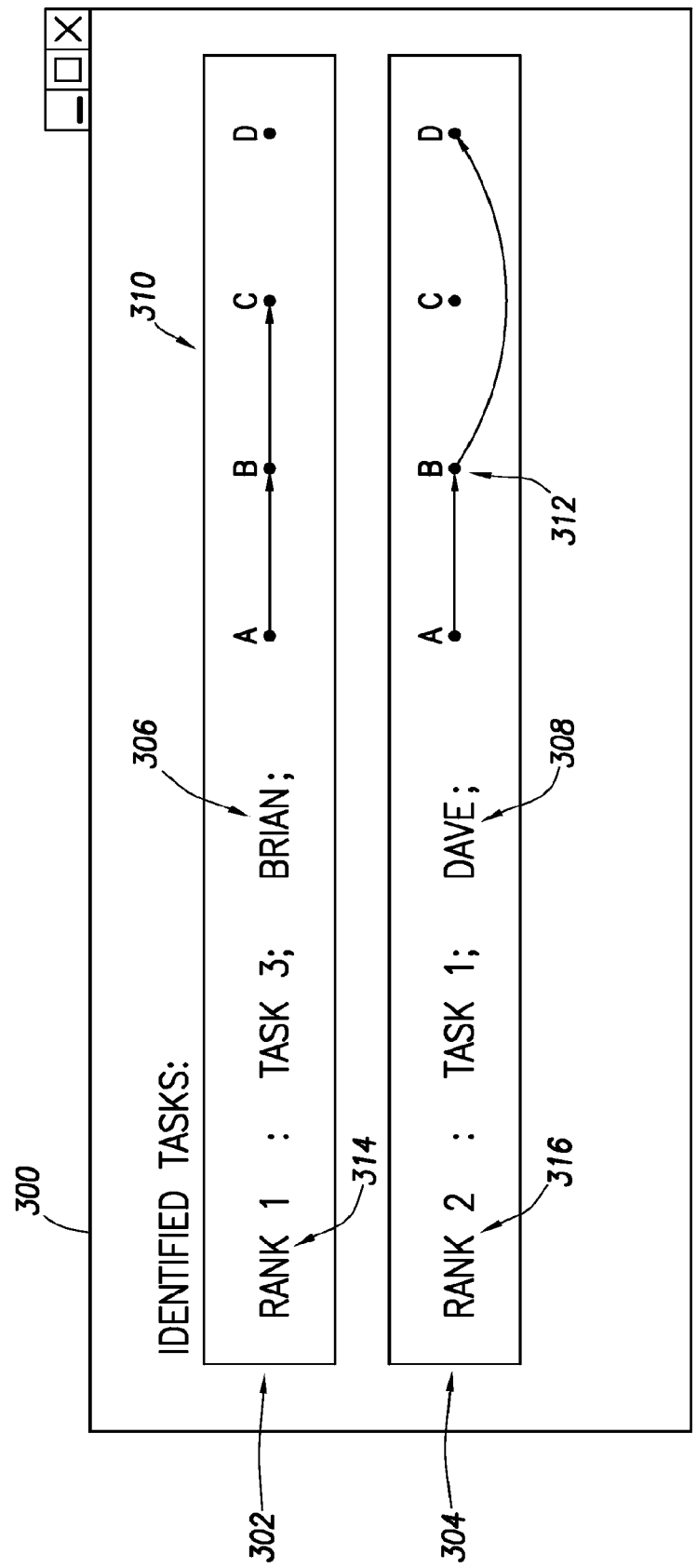
FIG. 3A shows a window reporting data on tasks in accordance with at least some embodiments.

FIG. 3A shows an example user interface window 300. In particular, FIG. 3 shows tasks that may be identified based on a query sent the server, the query seeking the identity of tasks to achieve a particular overall result. In the example situation, the window comprises data regarding two tasks: "Task 3" 302; and "Task 1" 304. In the example window 300, not only the tasks which meet the search criteria provided, but the information also includes the identity of the user who performed the task. The entry 302 associated with "Task 3" indicates Brian performed the identified task previously by indicator 306, and entry 304 associated with "Task 1" indicates Dave performed the identified task by indicator 308. Again, the exact identity of the user that performed the task previously is not necessarily shown, particularly if the task data spans different companies. In some cases, a number randomly assigned to a user may be shown, or an indication of the number of years of experience the person who performed the task had without specifically identifying. Moreover, each entry delineates the steps of each of the identified tasks. The entry 302 associated with "Task 3" indicates the task comprises steps in the order A, B, and then C in graphical portion 310. Entry 304 associated with "Task 1" indicates the task comprises steps in the order A, B, and then D in graphical portion 312. The example tasks shown in FIG. 3A each comprise only three steps, but tasks may comprise many tens of steps, and thus the window 300 may provide valuable information to the novice user on not only the availability of tasks, but a description of the various steps within complicated tasks.

In some example systems, providing the identity of tasks which meet a query request may be sufficient. For example, where the group of experienced users is small, the novice user may be provided a usable set of information regarding tasks. However, in other cases, for example where the number of experienced users is large, the tasks that meet query criteria may be ranked for the benefit of the novice user. Still referring to FIG. 3A, the example entries 302 and 304 are ranked within the window 300. In the example situation, the rank is shown by a rank identifier 314 for entry 302, and 316 for entry 304. The precise method by which tasks are ranked depends on many factors. For example, rank may be decided based on: number of steps of each task; time to perform the respective tasks; identity of a user that previously performed each task (e.g., higher weight given to task performed by more experienced users, or users designated as "expert"); and number of users that perform an identical task.

In some cases, the server 120 may rank the tasks according to predetermined criteria prior to sending the query results to the requesting user (in FIG. 1, sending the query results to the novice user 108). In other cases, the workstation upon which the user operates may perform the ranking based on "raw" data provided by the server 120. In yet still other cases, a partial ranking may be performed by the server 120 (e.g., rank based on number of users that performed identical tasks over time), and the workstation 118 may perform further ranking (e.g., based on criteria provided by the user 108, such as a desire to see tasks where Amit was the user who performed the task previously).

Figure 3B:
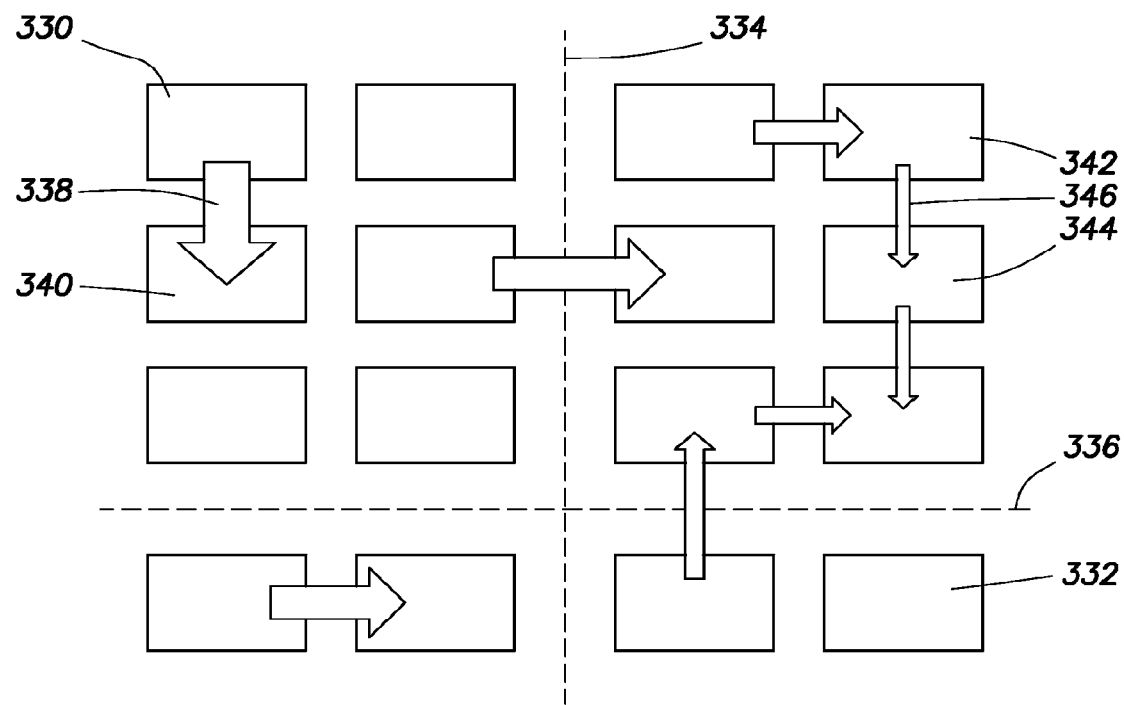
FIG. 3B shows an example visual representation of steps in accordance with at least some embodiments.

The example graphical portions 310 and 312 visually show the steps associated with the delineated tasks; however, other visual representations may be used. For example, FIG. 3B shows, in block diagram form, a visual representation of steps, and how the steps may be interconnected to form tasks. In particular, each block in the FIG. 3B may be step (e.g., block 330 represents a step, and block 332 represents a step). The dashed lines 334, 336 in FIG. 3B show an example relationship of modules within the software. Thus, for example, the step represented by block 330 is in a different module (e.g., different licensed module, different library of functions) than the step represented by block 332. Finally, the arrows between the blocks illustrate the progression between steps, and the width of the arrows may represent how often such progressions are made. For example, the wide arrow 338 between block 330 and the block 340 indicates the progression from the step represented by block 330 to the step represented by block 338 is taken by users more often than, for example, a progression between a step represented by block 342 and a step represented by block 344, as shown by narrow arrow 346. Thus, the graphical portions 310 or 312 of the FIG. 3A may contain more detailed information, such as visual representation in FIG. 3B.

Figure 3C:
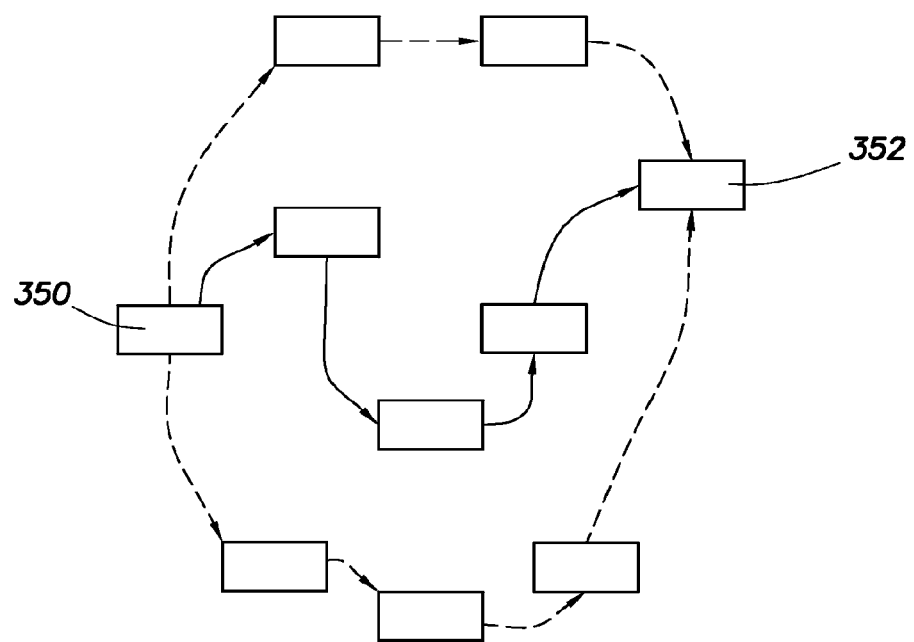
FIG. 3C shows an example visual representation of steps in accordance with at least some embodiments.

FIG. 3C shows yet another example visual representation that may be shown in addition to and/or in place of any of the visual representations previously discussed. In particular, FIG. 3C shows, in block diagram form, how steps may be interconnected to form tasks. In particular, each block in the FIG. 3C may be step (e.g., block 350 represents a step, and block 332 represents a step). Over time, predominant paths through the steps may begin to form, as shown by the solid lines arrows. However, non-predominant paths may also be present between the example tasks 350 and 352, as illustrated by the upper path (shown with dashed lines), or the lower path (also shown with dashed lines). Thus, the graphical portions 310 or 312 of the FIG. 3A may contain more detailed information, such as visual representation in FIG. 3C.

Figure 4:
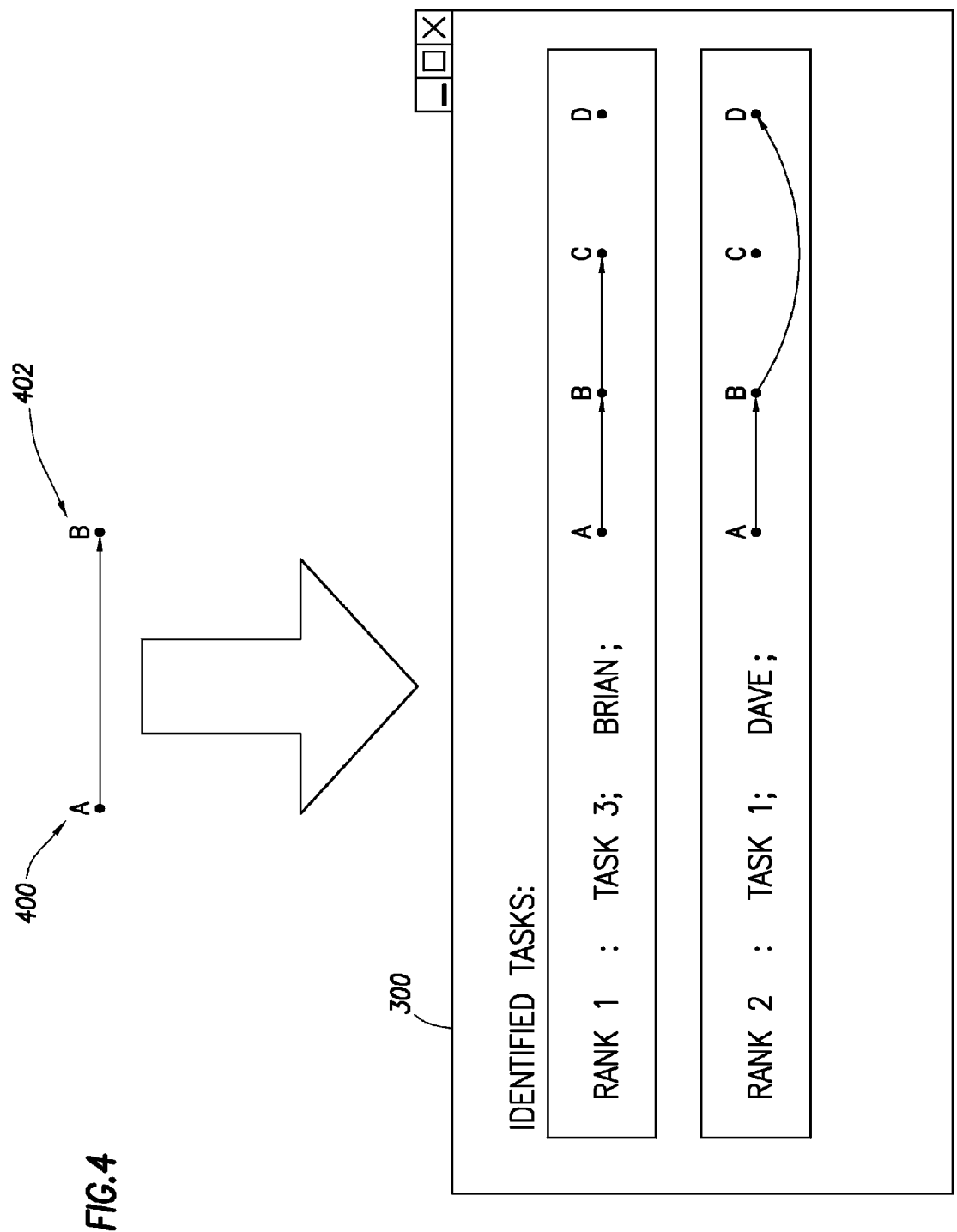
FIG. 4 graphically shows automatic reporting in accordance with at least some embodiments.

The discussion with respect to the query and response to this point has assumed that information regarding tasks is provided only upon specific inquiry with the server 120 implementing the data store 200. However, in yet still further embodiments the information may be "automatically" provided. FIG. 4 shows a logical relationship between a series of steps performed by a user and the window 300. In particular, consider a situation where user (e.g., user 108 on workstation 118) invokes a first step A 400, and then invokes a second step B 402. The server 120, receiving indications of user 108 invoking steps A and B, may search the data store 200 for tasks which include steps performed in the order A then B. In the example tracked steps 240, the server 120 may identify "Task 1" performed by Dave (as steps A, B, and D) and "Task 3" performed by Brian (as steps A, B, and C). Keeping in mind that for purposes of the discussion the overall result associated with "Task 1" and "Task 3" are defined (or determined) to be substantially the same, the server 120 may send data to the workstation 118 with which window 300 is constructed, the sending without the user 108 issuing a specific query. The workstation 118 may then display the window with the information. In this example situation, the novice user 108 may thus be presented with two possible paths to achieve the overall result embarked upon.

The various example systems discussed to this point have assumed that the data store 200 resides within the server 120; however, the server 120 may be omitted in some example systems, and the data store implemented in one or more of the workstations 112, 114, 116, and 118. Moreover, the various example systems to this point have assumed that gathering of the knowledge (i.e., sending of the indications of tasks performed by the users) occurs simultaneously with providing the knowledge to the users like the novice user 108; however, in other cases the tracked steps within the data store may be compiled days, weeks, months, or years in advance. Thus, the group of "current" users of a complex software application may not themselves have contributed to the knowledge contained in the tracked steps 240 within the data store 200. The opposite is also true, that a user that has contributed to the knowledge contained in the tracked steps 240 within the data store 200 may likewise call upon the knowledge as desired.

The specification now turns to example instrumentation of the complex software application to enable reporting of tasks and/or steps for purposes of knowledge transfer. The precise mechanism by which a complex software application is instrumented will depend heavily on how the complex software application was originally programmed and how the software application transitions between the various functional modules. What follows is a high level description of instrumentation philosophies. For purposes of discussion, the instrumentation philosophies are broken into two broad categories: embedded methods; and intervening methods. The discussion starts with embedded methods.

Figure 5:
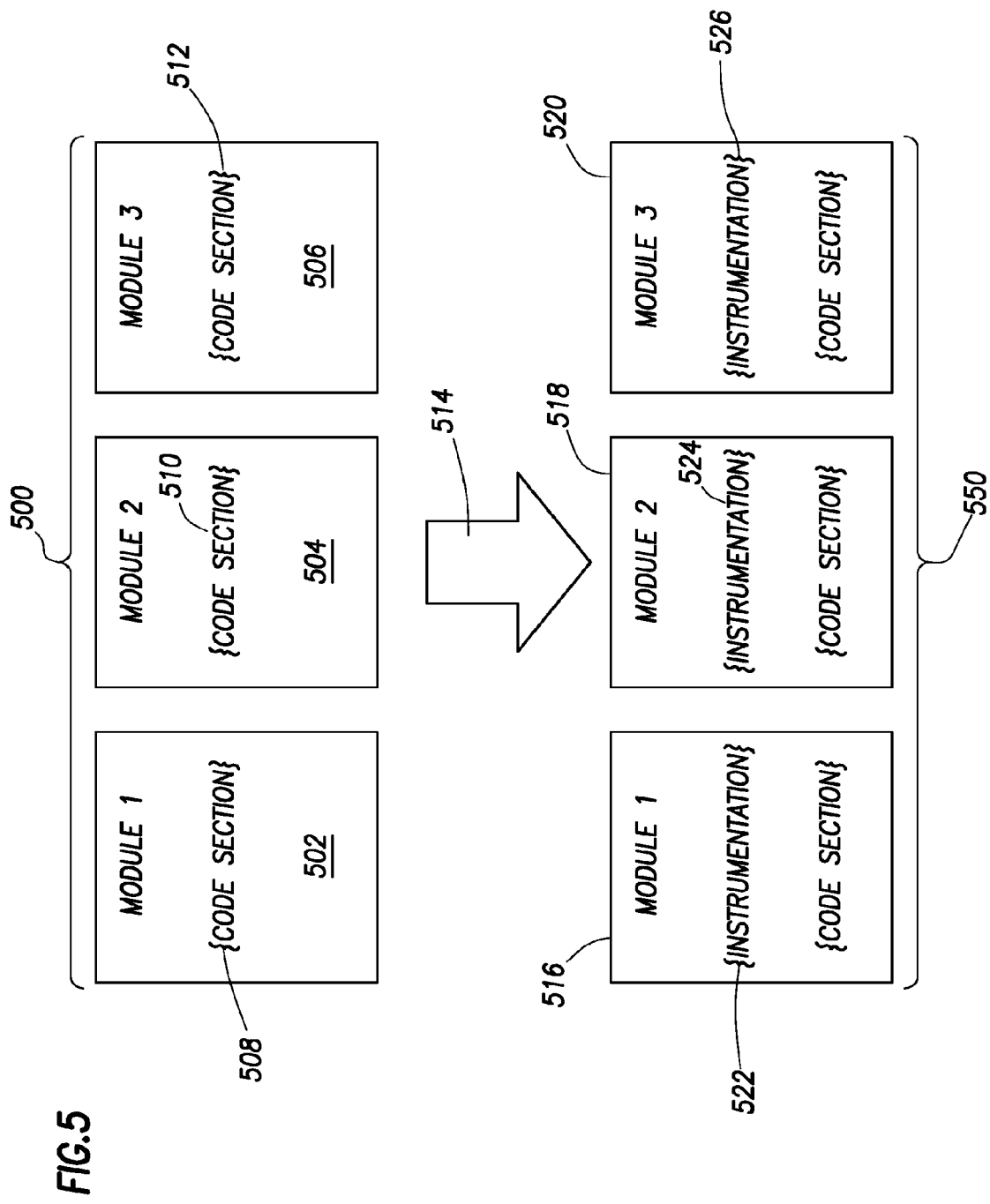
FIG. 5 shows, in block diagram form, instrumenting the software in accordance with at least some embodiments.

FIG. 5 shows, in block diagram form, a visual depiction of an embedded method of instrumenting the software application for use in knowledge transfer as described herein. In particular, FIG. 5 shows a software application 500 comprising three example modules 502, 504, and 506. The "modules" may be subroutines within the overall software application, or separately licensed modules that work together to achieve overall results. Within each module 502, 504, and 506 may reside code sections 508, 510, and 512 which implement the function of the software application 500. A complex software application may comprise many hundreds or thousands of modules, but FIG. 5 is limited to three modules so as not to unduly complicate the discussion. The software application 500 in the upper part of the figure is to show the software application prior to instrumentation to implement the various example systems. In instrumenting the software application in the case of embedded instrumentation (the instrumenting illustrated by arrow 514), each module which represents a step or steps may be modified at the program code level to be the instrumented software application 550. Thus, lower modules 516, 518, and 520 represent modules 502, 504, and 506, respectively, with additional code to implement the step reporting features. In particular, each module 516, 518, and 520 comprises instrumentation code 522, 524, and 526, respectively. Thus, each time an instrumented module is executed by a processor, the instrumentation code performs the reporting function to the data store 200, regardless of location of the data store.

Figure 6:
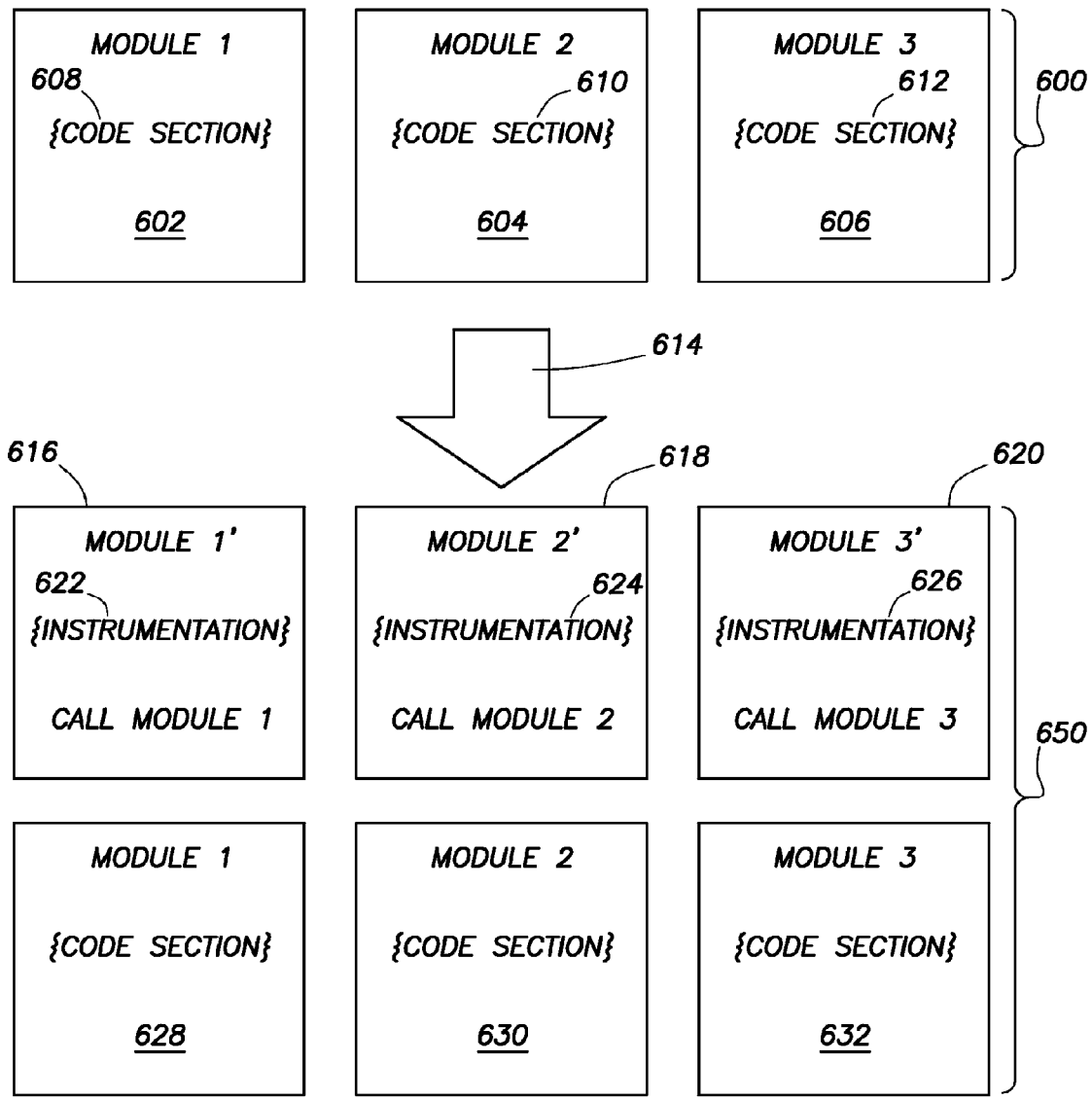
FIG. 6 shows, in block diagram form, instrumenting the software in accordance with at least some embodiments.

FIG. 6 shows, in block diagram form, a visual depiction of an intervening method of instrumenting the software application for use in knowledge transfer as described herein. In particular, FIG. 6 shows a software application 600 comprising three example modules 602, 604, and 606. The "modules" may be subroutines within the overall software application, or separately licensed modules that work together to achieve overall results. Within each module 602, 604, and 606 may reside code section 608, 610, and 612 which implement the function of the software application 600. In instrumenting the software application in the intervening instrumentation case (the instrumenting illustrated by arrow 614), instrumentation modules 616, 618, and 620 are created which including the instrumentation code 622, 624, and 626, respectively. The main loop of the software application is modified to call the instrumentation modules 614, 618, and 620 rather than directly call the modules 628, 630, and 632 (which in this case may be identical to modules 602, 604, and 606, respectively). The instrumentation modules 616, 618, and 620 are programmed to, when called, perform the instrumentation task and then call the corresponding software modules 628, 630, and 632, respectively. Thus, the instrumented software application 650 is the combination of the new "intervening" modules 616, 618, and 612 along with the original modules. In this way, not only can the instrumentation modules know (by being executed) that specific modules have been called, but based on the structure any data returned from the modules 628, 630, and 632 will be returned to the calling "intervening" modules, and analyzed for extraction of details regarding identity of steps and/or tasks before being passed to the main program loop.

In yet still other cases, the instrumentation may involve a combination of the embedded and intervening instrumentation cases.

Figure 7:
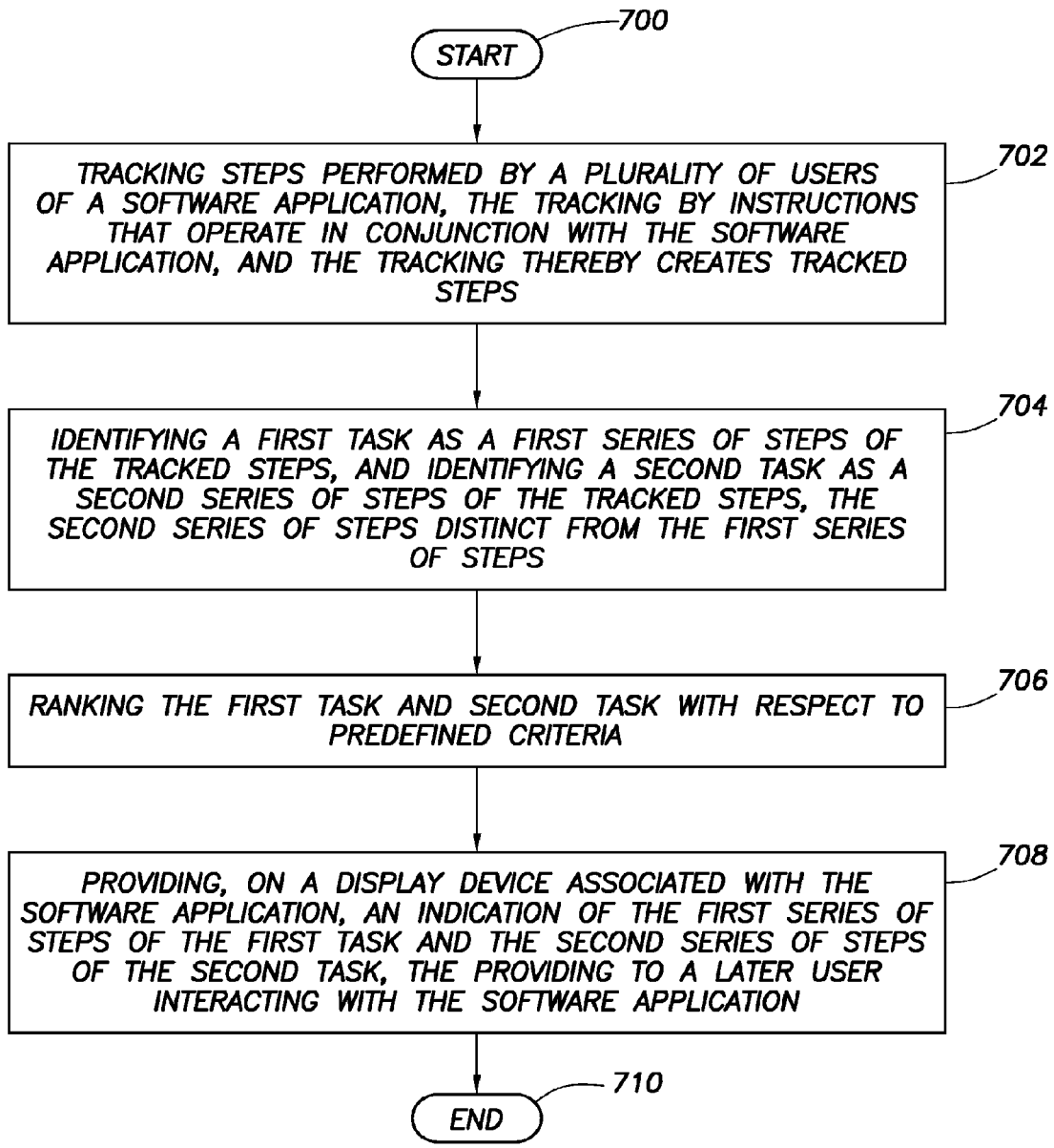
FIG. 7 shows a method in accordance with at least some embodiments.

FIG. 7 shows a method (some or all of which may be implemented by software executing on a processor) in accordance with example systems. In particular, the method may start (block 700) and comprise: tracking steps performed by a plurality of users of a software application, the tracking by instructions that operate in conjunction with the software application, and the tracking thereby creates tracked steps (block 702); identifying a first task as a first series of steps of the tracked steps, and identifying a second task as a second series steps of the tracked steps, the second series of steps distinct from the first series of steps (block 704); ranking the first task and second task with respect to predefined criteria (block 706); and providing, on a display device associated with the software application, an indication of the first series of steps of the first task and the second series of steps of the second task, the providing to a later user interacting with the software application (block 708). Thereafter, the method ends (block 710), in many cases to be immediately restated.

Figure 8:
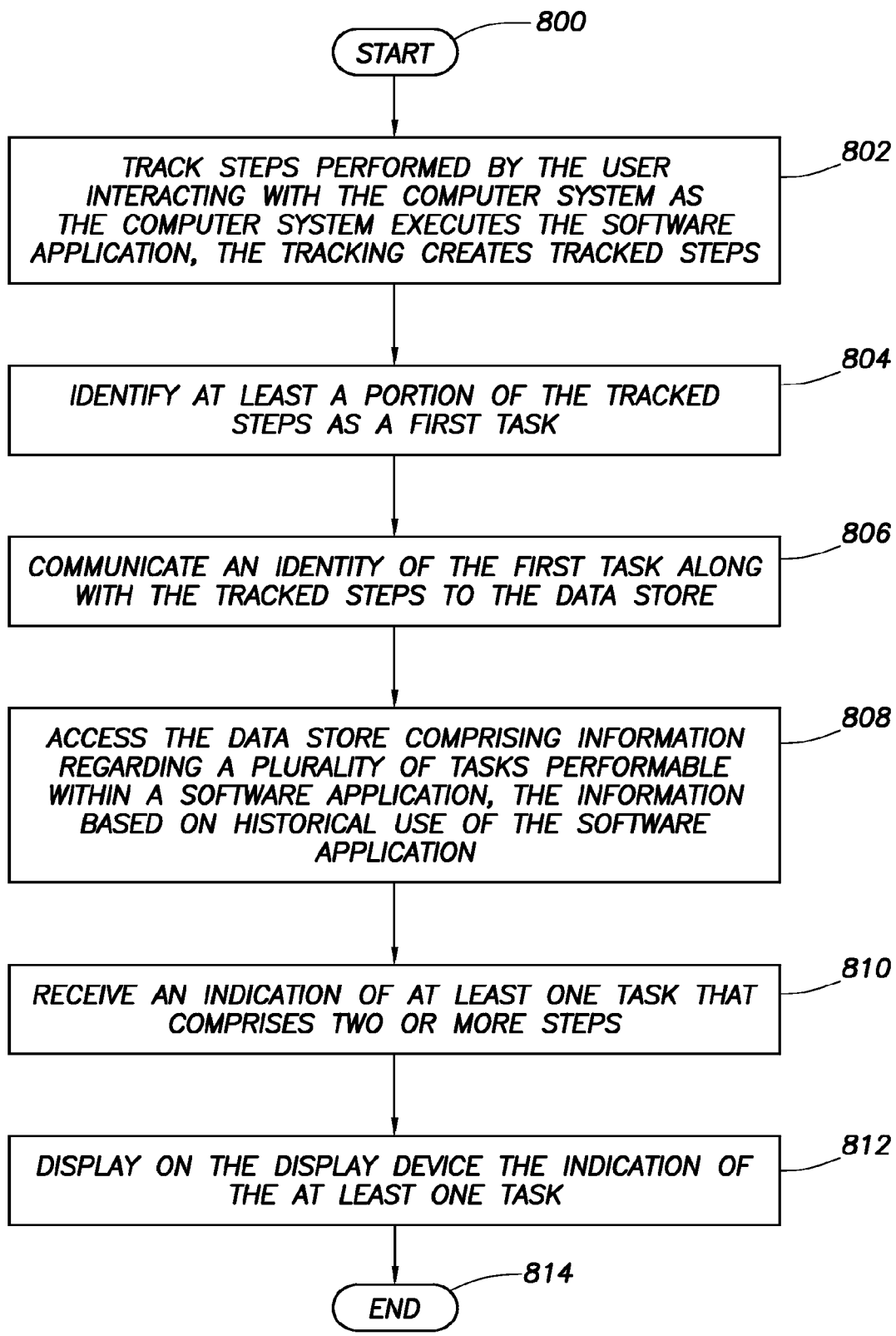
FIG. 8 shows a method in accordance with at least some embodiments.

FIG. 8 shows a method (some or all of which may be implemented by software executing on a processor) in accordance with example systems. In particular, the method starts (block 800) and comprises: tracking steps performed by the user interacting with the computer system as the computer system executing the software application, the tracking creates tracked steps (block 802); identifying at least a portion of the tracked steps as a first task (block 804); communicating an identity of the first task along with the tracked steps to the data store (block 806); accessing the data store comprising information regarding a plurality of tasks performable within a software application, the information based on historical use of the software application (block 808); receiving an indication of at least one task that comprises two or more steps (block 810); and displaying on the display device the indication of the at least one task (block 812). Thereafter, the method ends (block 814), possibly to be immediately restarted.

Figure 9:
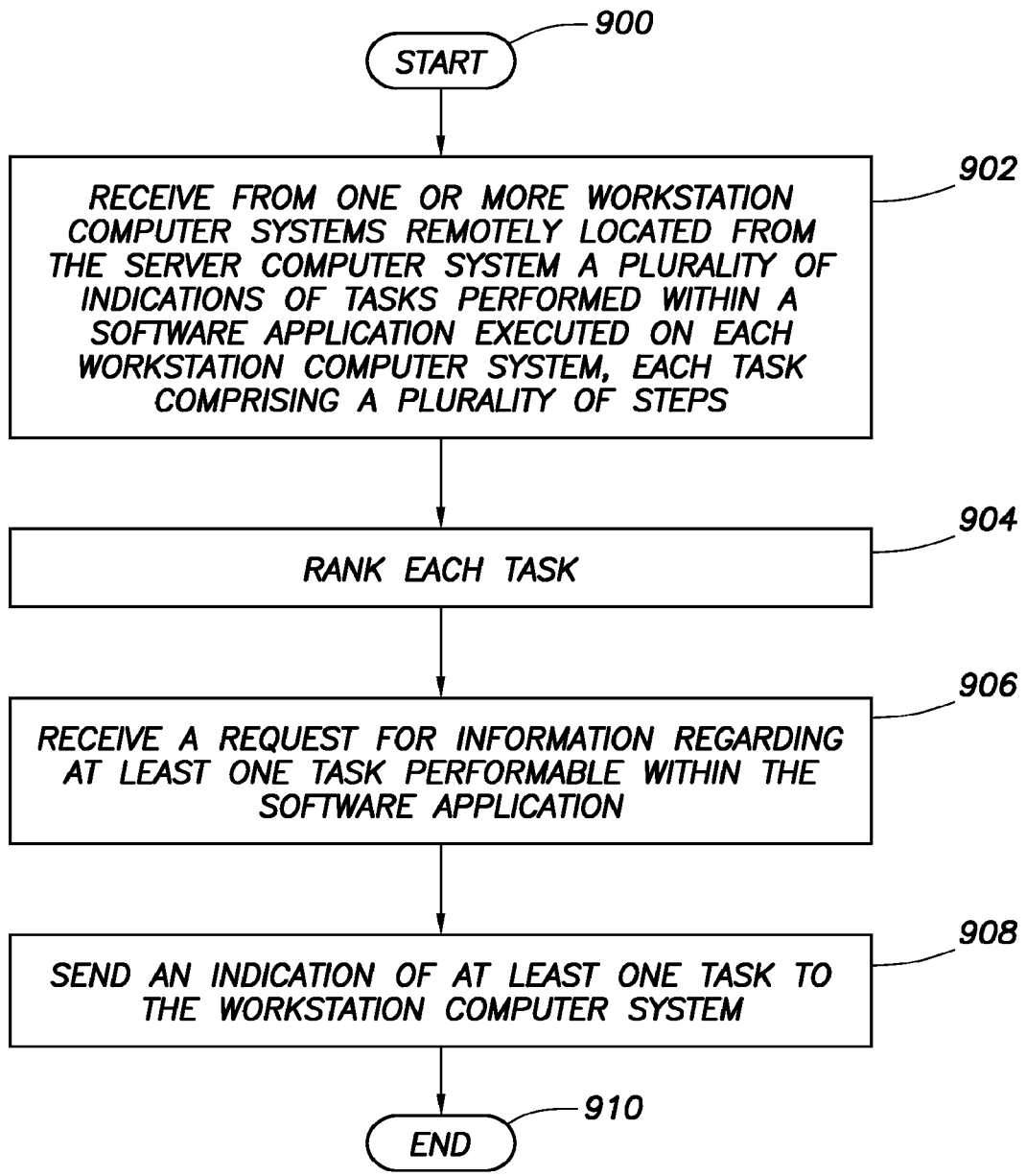
FIG. 9 shows a method in accordance with at least some embodiments.

FIG. 9 shows a method (some or all of which may be implemented by software executing on a processor) in accordance with example systems. In particular, the method starts (block 900) and comprises: receiving from one or more workstation computer systems remotely located from the server computer system a plurality of indications of tasks performed within a software application executed on each workstation computer system, each task comprising a plurality of steps (block 902); ranking each task (block 904); receive a request for information regarding at least one task performable within the software application (block 906); and sending an indication of at least one task to the workstation computer system (block 908). Thereafter, the method ends (block 910), possibly to be immediately restated.

Figure 10:
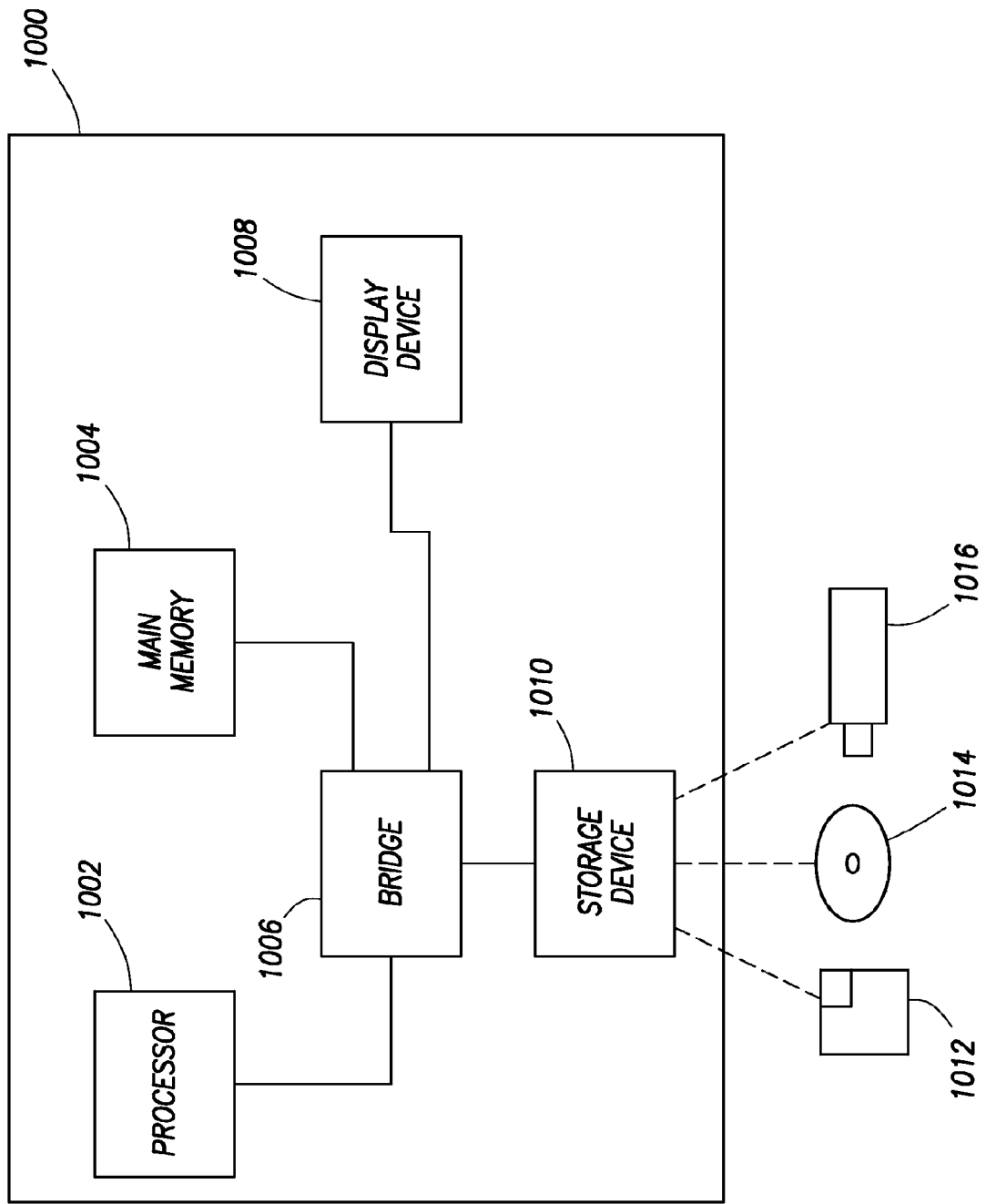
FIG. 10 shows a computer system in accordance with at least some embodiments.

FIG. 10 illustrates a computer system 1000 in accordance with at least some embodiments. Computer system 1000 is illustrative of any of the workstations 112, 114, 116, 118 and/or the server 120. In particular, computer system 1000 comprises processor 1002 coupled to a main memory array 1004, and various other peripheral computer system components, through a bridge device 1006. The processor 1002 may be a single processor core device, or a processor implementing multiple processor cores. Furthermore, computer system 1000 may implement multiple processors 1002. In other cases, processor 1002 and main memory may be directed coupled, or may an integrated product.

The main memory 1004 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 1004 is an example of a non-transitory computer-readable medium storing programs and instructions.

The illustrative computer system 1000 also comprises a display device 1008 coupled to the processor 1002 by way of the bridge 1006. The display device 1008 may be any currently available or after-developed device which displays text and/or graphics for viewing, such as a liquid crystal display (LCD). The illustrative computer system 1000 also comprise a storage device 1010 coupled to the processor 1002 by way of the bridge device 1006. The storage device 1010 may be any suitable long term storage system, such as a magnetic disk storage system (illustratively shown as a "floppy" disk 1012), an optical disk 1014, or solid state storage (illustrative shown as a flash memory device 1016). The storage device 1010 (and the variants shown) is an also example of a non-transitory computer-readable medium storing programs and instructions.

It is noted that while theoretically possible to perform some or all the tracking, ranking, and providing of knowledge related to tasks discussed above by a human using only pencil and paper, the time measurements for human-based performance of such tasks may range from man-hours to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments, and/or to create a non-transitory computer-readable storage medium (i.e., other than an signal traveling along a conductor or carrier wave) for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
    tracking steps performed by a plurality of users of a software application, based on each user's interactions with the software application executable at a computing device of that user;
    identifying a first series of steps within the tracked steps as a first task that produces an overall result within the software application;
    identifying a second series of steps within the tracked steps as a second task that also produces the same overall result within the software application as the first task;
    ranking the first and second tasks based on an identity of each user that previously performed the respective first and second tasks;
    receiving an indication of a later user performing one or more steps in at least one the first series of steps identified for the first task or the second series of steps identified for the second task, based on the later user's interactions with the software application executable at a computing device of the later user; and
    responsive to the received indication, providing, for display on a display device coupled to the later user's computing device, a visual representation of the first series of steps for the first task and the second series of steps for the second task along with an indication of rank as between the first and second tasks.

2. The method of claim 1, wherein:
    the first task is performed by a first experienced user, the second task is performed by a second experienced user, and the later user is a novice user;
    tracking comprises tracking steps performed by the first and second experienced users, based on each of the first and second experienced user's interactions with the software application at respective computing devices of the first and second experienced users; and
    providing comprises providing, for display on the display device coupled to the novice user's computing device, a visual representation of each of the first and second series of steps for the respective first and second tasks performed by the first and second experienced users.

3. The method of claim 2, wherein identifying comprises:
    programmatically identifying the first series of steps within the tracked steps performed by the first experienced user as the first task; and
    programmatically identifying the second series of steps within the tracked steps performed by the second experienced user as the second task.

4. The method of claim 2, wherein each of the tracked steps includes a task identifier associating the step with a task performed by a user of the software application, and identifying comprises:
    identifying the first series of steps within the tracked steps performed by the first experienced user as the first task, based on a corresponding first task identifier associated with each step of the first series of steps; and
    identifying the second series of steps within the tracked steps performed by the second experienced user as the second task, based on a corresponding second task identifier associated with each step of the second series of steps.

5. The method of claim 2, wherein providing further comprises:
    providing the visual representation of each of the first and second series of steps for display on the display device of the novice user's computing device, responsive to a request received from the novice user's computing device for tasks performable within the software application that produce the overall result associated with the respective first and second tasks performed by the first and second experienced users.

6. The method of claim 2, wherein providing further comprises:
    providing the visual representation of each of the first and second series of steps for the respective first and second tasks along with an indication of the identity of each of the first and second experienced users for display on the display device of the novice user's computing device, responsive to receiving an indication of the novice user initiating a portion of at least one of the first series of steps or the second series of steps.

7. The method of claim 2, wherein providing comprises:
    providing a visual representation of the first series of steps to be displayed on the display device of the novice user's computing device with information related to the first experienced user and the first task performed by the first experienced user; and
    providing a visual representation of the second series of steps to be displayed on the display device alongside the visual representation of the first series of steps and with information related to the second experienced user and the second task performed by the second experienced user.

8. The method of claim 1, wherein ranking further comprises:
    ranking the first task performed by the first experienced user and the second task performed by the second experienced user, based on predefined criteria in addition to the identity of each of the first and second experienced users.

9. The method of claim 8 wherein the predefined criteria is selected from the group consisting of: a number of steps associated with each task; a time to perform each task; and a number of users known to have performed each task.

10. The method of claim 1, further comprising:
    storing information relating to the first and second tasks performed by the respective first and second experienced users of the software application within a data store.

11. The method of claim 1 wherein the first and second experienced users have relatively more experience with using the software application than the novice user.

12. A computer system comprising:
    a processor; and
    a memory coupled to the processor, the memory storing a program that, when executed by the processor, causes the processor to perform a plurality of functions, including functions to:
        track steps performed by a plurality of users of a software application, based on each user's interactions with the software application executable at a computing device of that user;
        identify a first series of steps within the tracked steps as a first task that produces an overall result within the software application;
        identify a second series of steps within the tracked steps as a second task that also produces the same overall result within the software application as the first task;
        rank the first and second tasks based on an identity of each user that previously performed the respective first and second tasks;
        receive an indication of a later user performing one or more steps in at least one the first series of steps identified for the first task or the second series of steps identified for the second task, based on the later user's interactions with the software application executable at a computing device of the later user; and responsive to the received indication, provide, for display on a display device coupled to the later user's computing device, a visual representation of the first series of steps for the first task and the second series of steps for the second task along with an indication of rank as between the first and second tasks.

13. The computer system of claim 12, wherein the first task is performed by a first experienced user, the second task is performed by a second experienced user, and the later user is a novice user, and the functions performed by the processor further include functions to communicate with a data store via a network to store the first and second series of steps within the data store in association with information identifying the first and second tasks as performed by the first and second experienced users, respectively.

14. The computer system of claim 13, wherein the functions performed by the processor further include functions to communicate with the data store via the network to access the first and second series of steps stored within the data store for the first and second tasks performed by the first and second experienced users, respectively.

15. The computer system of claim 13, wherein the functions performed by the processor further include functions to:

provide a visual representation of the second series of steps to be displayed on the display device of the novice user's computing device for the second task as performed by the second experienced user alongside the visual representation of the first series of steps for the first task as performed by the first experienced user.

16. The computer system of claim 15, wherein the visual representation provided for each of the first and second series of steps includes the identity of the corresponding first and second experienced users of the software application.

17. The computer system of claim 15, wherein the functions performed by the processor further include functions to:

rank the first and second tasks performed by the respective first and second experienced users according to predetermined criteria in addition to the identity of each of the first and second experienced users.

18. The computer system of claim 17, wherein the predetermined criteria is selected from the group consisting of: a number of steps associated with each task; a time to perform each task; and a number of users known to have performed each task.

19. The computer system of claim 15, wherein program further causes the processor to:

programmatically identify the first series of steps within the tracked steps performed by the first experienced user as the first task; and programmatically identify the second series of steps within the tracked steps performed by the second experienced user as the second task.

20. The computer system of claim 15, wherein each of the tracked steps includes a task identifier associating the step with a task performed by a user of the software application, and the functions performed by the processor further include functions to:

identify the first series of steps within the tracked steps performed by the first experienced user as the first task, based on a corresponding first task identifier associated with each step of the first series of steps;

identify the second series of steps within the tracked steps performed by the second experienced user as the second task, based on a corresponding second task identifier associated with each step of the second series of steps; and communicate with a data store via the network to store the first task identifier along with the first series of steps identified for the first task as performed by the first experienced user and the second task identifier along with the second series of steps identified for the second task as performed by the second experienced user.

21. The computer system of claim 20, wherein each of the tracked steps further includes a user identifier indicating the identity and a level of experience of each user who performed the step for a corresponding task within the software application.

22. A computer system comprising:

a processor; and a memory coupled to the processor, the memory storing a program that, when executed by the processor, causes the processor to:

receive, from a first experienced user's workstation computer via a network, a first series of steps performed by the first experienced user within a software application executable at the first experienced user's workstation computer;

identify the first series of steps as a first task performed by the first experienced user that produces an overall result within the software application;

receive, from a second experienced user's workstation computer via a network, a second series of steps performed by the second experienced user within the software application executable at the second experienced user's workstation computer;

identify the second series of steps as a second task performed by the second experienced user that produces the same overall result within the software application as the first task;

rank the first and second tasks based on an identity of each of the first and second experienced users that previously performed the respective first and second tasks;

receive, from a novice user's work station computer via the network, an indication of the novice user performing one or more steps in at least one of the first series of steps associated with the first task or the second series of steps associated with the second task within the software application; and responsive to the received indication, send, via the network to the novice user's workstation computer for display at the novice user's computing device, a visual representation of the first series of steps for the first task as performed by the first experienced user and the second series of steps for the second task as performed by the second experienced user along with an indication of rank as between the first and second tasks.

23. The computer system of claim 22, wherein the functions performed by the processor further include functions to:

receive via the network tracked steps performed by different experienced users of the software application executable at respective workstation computers of the different experienced users; and identify a different series of steps within the tracked steps for each of a plurality of tasks performed by the different experienced users within the software application executable at their respective workstation computers.

24. The computer system of claim 23, wherein the program further causes the processor to rank the plurality of tasks based on one or more criteria selected from the group consisting of: number of steps associated with each task; time to perform a task; identity of a user that previously performed a specific task; and number of users that perform a specific task.

25. The computer system of claim 23, wherein the functions performed by the processor further include functions to:

communicate with a data store via the network to store information relating to the different series of steps identified for each of the plurality of tasks performed by the different experienced users of the software application;

access the stored information within the data store to identify one or more tasks within the plurality of tasks performed by the different experienced users that include steps matching the one or more steps performed by the novice user of the software application or that produce the same overall result as the task performed by the first experienced user, based on the indication received from the novice user's workstation computer; and send, via the network to the novice user's workstation computer, a visual representation of the different series of steps corresponding to each of the identified one or more tasks for display at the novice user's workstation alongside the visual representation of the first series of steps for the task performed by the first experienced user.

* * * * *